United States Patent [19]
Wheatley

[11] 4,036,252
[45] July 19, 1977

[54] FULL BORE PIPELINE VALVE APPARATUS

[76] Inventor: Thomas Wheatley, 3717 Pinemont, Houston, Tex. 77018

[21] Appl. No.: 605,231

[22] Filed: Aug. 18, 1975

[51] Int. Cl.² .................. F16K 15/03; F16K 15/18
[52] U.S. Cl. .............................. 137/527.8; 137/268
[58] Field of Search .............. 137/527, 527.2, 527 A, 137/527.6, 527.8, 268; 251/82, 298

[56] References Cited

U.S. PATENT DOCUMENTS

| | | | |
|---|---|---|---|
| 3,318,568 | 5/1967 | Blomstran | 251/298 X |
| 3,612,098 | 10/1971 | Bora | 137/527 |
| 3,720,225 | 3/1973 | Wheatley, Jr. | 137/527.8 X |
| 3,720,228 | 3/1973 | Wheatley, Jr. | 137/454.2 |
| 3,875,963 | 4/1975 | Buck | 251/82 X |

Primary Examiner—William R. Cline
Attorney, Agent, or Firm—Donald Gunn

[57] ABSTRACT

This disclosure is directed to a full opening check valve for use in a pipeline. The apparatus incorporates a funnel shaped body which is welded to a pipe in the pipeline. The body encloses a chamber and an axial half circle guide extends thereacross and along part of the chamber to serve as a guide for pipeline pigs passing through this device. The funnel shaped body is welded to an end plate. The end plate has a slightly recessed circular shoulder on the inside. The circular shoulder sealingly receives a valve element. The valve element is constructed of a flat plate member and is hung from above on a straight barlike member serving as a hinge. The hinge extends from the end plate at the side. This enables the hinge rod to be connected to a damper or crank mechanism for controlled rotation. The end plate welds to a second pipe. This device is conveniently connected in the pipeline by welding to the connected pipes as mentioned above and provides a full opening to enable it to pass a pipeline pig, for example, having the diameter of the pipe.

3 Claims, 2 Drawing Figures

FULL BORE PIPELINE VALVE APPARATUS

BACKGROUND OF THE INVENTION

This disclosure is directed to a check valve for use in a pipeline. A check valve for a pipeline however is subject to certain constraints. Most pipelines are ordinarily cleaned through the use of pipeline pigs. Pigs are elongate bodies typically formed of polyurethane. They normally are either round or elongate bullet shaped bodies. Pipeline pigs are also used to separate different products. For instance, different petrochemical products can be pumped through a pipeline if they are separated by a sequence of pipeline pigs.

Quite often, check valves are required at spaced intervals in pipelnes. Check valve must permit 100% of the flow of the pipeline in the required direction and must close against flow in the opposite direction.

The rate of rotation of a check valve in the pipeline is of interest. Normally, they are mounted on a hinge. The hinge includes a pin which in this disclosure is extended to the side. At the side of the housing itself, two things can be done advantageously with the pin. For one, the pin is exposed for connection to a hand operated handle. In the alternative, powered handles can be used. An easy example is the use of a hydraulic cylinder to rotate the pin and hence rotate the flapper valve attached to it. Another example is the use of a protruding pin to enable installation of a damping device. The present invention is particularly advantageous in that a damping device can be installed to dampen the jarring slamming shock occassioned when the flapper valve swings shut. This is very helpful. It prevents the flapper valve from chattering during the low flow rates. It also permits the use of a damping device to prevent slamming after a full gauge pig passes through the device. Pigs vary in shape but one common shape is an elongate pig. This keeps the flapper open for a longer interval. The present invention is thus able to be damped as the flapper valve falls back toward the closed position when the pig passes through the valve.

It is with these problems and others in mind that the present invention has been devised. This invention is in fact an improvement in that it provides a relatively inexpensive full opening check valve to be installed in a pipeline. It can be installed as illustrated and subsequently as desired, a fluid dampening mechanism or an external valve control lever mechanism can be connected to it.

SUMMARY OF THE INVENTION

This disclosure is directed to a full opening check valve for use in a pipeline. It is connected between two pipes, hereinafter referred to as first and second pipes. The apparatus includes a funnel shaped housing which encloses a semicircular guide channel. This defines the bottom side of the flow path. The guide channel is located so that it will support a pipeline pig which matches the diameter of the pipeline. The funnel shaped body is welded to the first pipe. An end plate is welded to the second pipe. The end plate is fairly thick and includes a recessed shoulder for receiving a flapper valve supported on a hinge pin. The hinge pin protrudes from the end plate and is mounted in a drilled hole therethrough, the outer end being received in a pressure tight seal which supports the pin at the desired location.

DESCRIPTION OF THE PREFERRED EMBODIMENT

Figure 1:
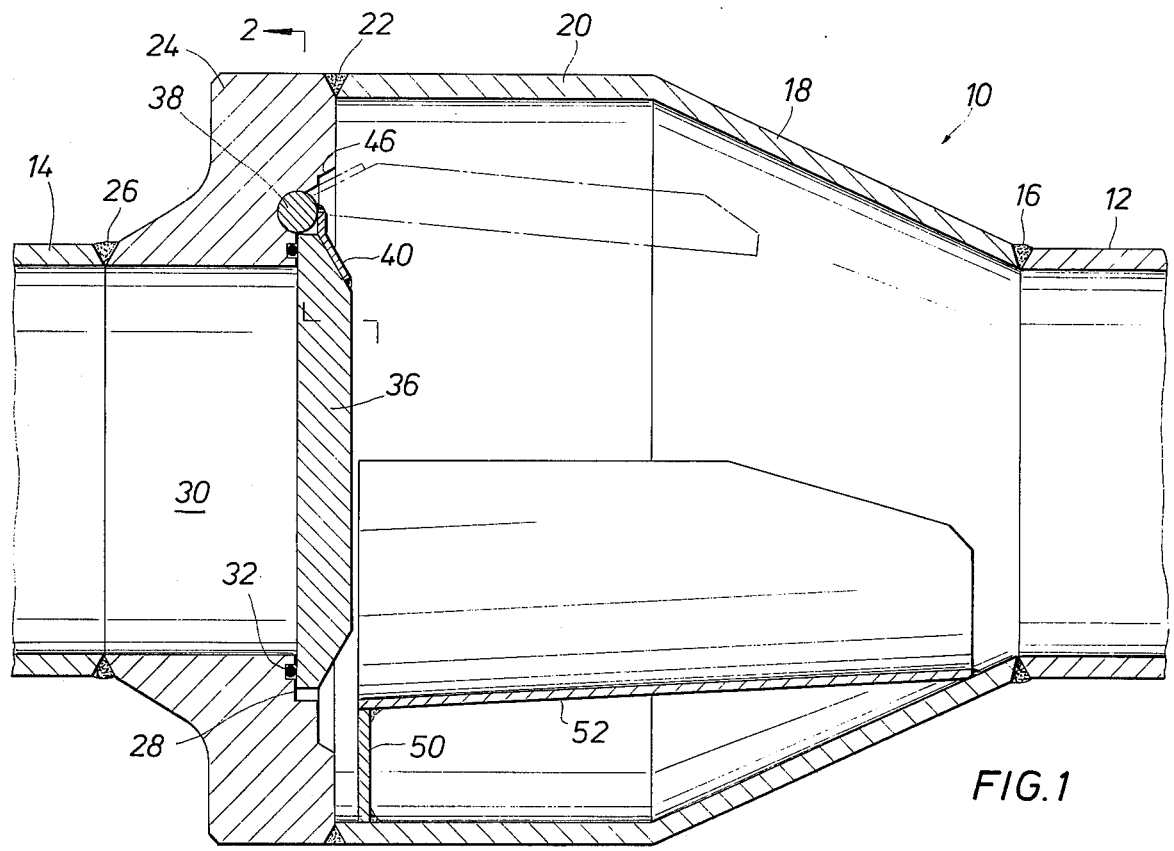
FIG. 1 is a longitudinal sectional view of the pipeline check valve.

FIG. 1 illustrates the preferred embodiment 10 in sectional view. It is adapted to be connected to a first pipe 12. A second pipe 14 is also shown. The pipes 12 and 14 are customarily of the same diameter and even the same wall thickness in most circumstances. The first pipe 12 is welded at 16 to a funnel shaped housing 18. The funnel shaped housing enlarges to a tubular straight wall portion 20. The portion 20 is concentric with the pipe 12. The portion 20 is welded at 22 to an end plate 24. The end plate 24 is itself welded at 26 to the pipe 14.

The end plate 24 is reasonably thick. It is thick so that it is able to be counter bored. The counter sunk bore extends to a shoulder 28. The shoulder 28 fully encircles the axial passage 30 through the plate 24. The end plate 24 thus is aligned with the pipe 14 and provides a full bore opening. The shoulder 28 is grooved and an o-ring 32 is received in the groove to serve as a seal. The seal 32 works against the face of a flapper valve 36. The valve 36 is a circular flat disc. It is sized to fit against the recessed face 28. The flapper valve 36 does not have to fit snuggly within the counter bored area. Rather, the valve 36 has a planar face which rests against the shoulder 28 and compresses the seal 32.

The flapper valve 36 is supported on a hinge pin 38. The hinge pin 38 is an elongate bar of round stock. It has welded to it a downwardly protruding tab 40 which is joined to the flapper valve 36. The tab 40 is of modest width and is joined to the rod 38 which serves as a hinge pin.

Figure 2:
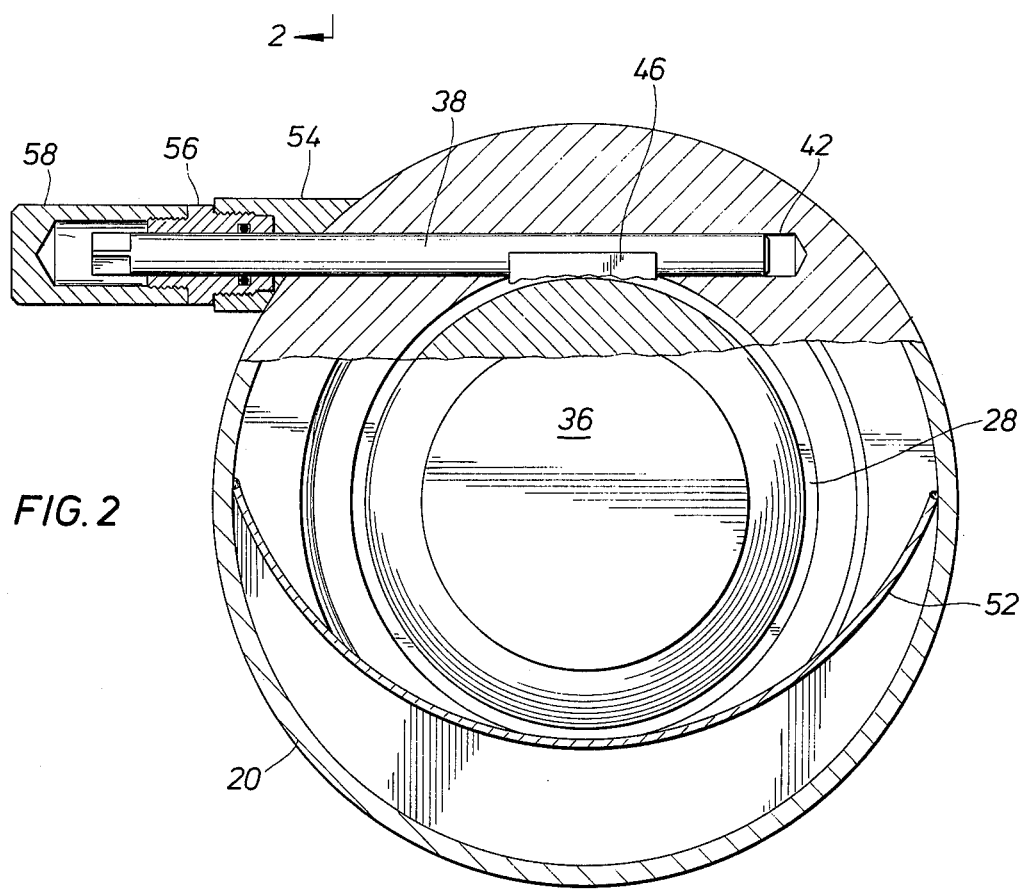
FIG. 2 is a sectional view showing details of valve element construction and the hinge pin supporting the valve element.

The end plate 24 is transversely drilled at 42 shown in FIG. 2. The transverse hole formed for the hinge pin 38 passes close to the groove for the o-ring 32. It is a straight line tangent to the flapper valve 36. Preferably, its location is known at all times so the pin 38 can be installed where the hinge pin 38 is horizontal.

The hinge pin 38 is just below a notch 46 formed just above the tab 40. This provides a receptacle where the tab 40 is seated when the pin 38 is rotated.

The tab 40 is on the downstream face of the flapper valve 36. THe valve opens up into the upper chambers of the funnel shaped housing 18 as shown in FIG. 1. It is raised either by the force of the flowing products in the pipeline or by the passage of a pipeline pig.

Continuing on with FIG. 1, the sectional view shows a quarter moon shaped insert 50. It is welded parallel to the end plate 24. It is preferably located at the bottom. It defines an edge which is shaped to receive and support a curved guide plate 52. The guide plate 52 is additionally shown in FIG. 2 to extend substantially across the funnel shaped housing 18. The guide plate 52 is attached by welding to the support member 50 at one end and at its opposite end by welding to the housing 18. FIG. 2 shows both parallel edges of the guide plate 52 welded to the housing 18. The guide plate is roughly tangent to the projected cross section of the pipeline where the valve 10 is connected. It will be observed that the housing 20 is somewhat wider than the pipeline. The guide plate 52 is preferably located on the bottom side when the valve is installed so that a pipeline pig travels on the guide plate. The guide plate is located just beyond the end plated 24. In the event that a pipeline pig passes through the valve, it will fall ever so slightly to the guide plate. The guide plate is sloped slightly upwardly toward the opening of the pipe 12. It carries the pig, spherical or otherwise, toward the pipe 12 and funnels it directly at the opening of the pipe, thereby aligning the pig for easy entry into the pipe 12. Pigs normally travel with full circle contact against the pipe. When they pass through the check valve 10 of this invention, they are momentarily free of contact along the top side except for the flapper valve 36 which is forced open into the dotted line position. They then pass all the way through the valve and enter the pipe 12. The movement is continuous with a pushing force behind the pig thereby causing the pig to enter the pipe 12 and travel on downstream.

In FIG. 2 if the drawings the end plate 20 incorporates a cylindrical extension 54. It is internally threaded, bored and counter bored to receive the hinge pin 38. The hinge pin connects into a nut 56 which as an internally located o-ring to prevent leakage along the hinge pin. It is not necessary for the hinge pin to fit snuggly in the hole 42 formed in the end plate 24. Rather, leakage is prevented at the seal is the nut 56. The nut 56 is externally threaded and receives a cap 58. The cap covers over the end of the hinge pin. The cap 58 normally protects the end of the hinge pin during shipment and installation. After installation, the cap 58 is easily unthreaded and removed. The end of the hinge pin 38 is color coded or shaped to indicate the position of the hinge and the valve. Additionally, the end of the pin is shaped to accept a lever or crank for hand operation. In the alternative, it is used to connect a damping mechanism.

The sizes of the valve 10 and the wall thicknesses depend on the nominal I. D. of the pipe and pressure rating thereof.

This check valve is advantageous over most devices presently available. It is particularly advantageous in that it can be positioned with a hinge pin at any desired angle relative to external support equipment such as flanges and the like. Limitations on the angular position of the hinge pin are generally undesirable. It is most desirable that the hinge be rotated to the horizontal and that the flapper valve 36 swing upwardly, not to the side. Further, it is advantageous in cost in that the shapes shown in the drawing are geometricly simple. This is true of the funnel shaped housing 18 and the end plate 24. The end plate 24 is particularly economical in construction. It is concentrically bored to match the diameter of the pipeline. It has a short stub at the left hand end which terminates at a tapered edge for ease of welding. It flares outwardly to a diameter to match the funnel shaped housing. It need not be any larger and hence, the amount of metal in the end plate 24 is reduced. The cost of the metal in the end plate 24 is noteworthy. Normally, machined metal has a fairly substantial price which can be approximated by weight. The reduction of weight in the end plate is thus a reduction in cost. The end plate is centrally counter bored to define the face 28 but this too is not a critical operation in that it can be wider than the flapper valve without harm.

The valve 10 of this invention is thus quite economical to use and install. The reductions in cost have not been achieved at a cost of reliability, safety or operability.

The foregoing is directed to the preferred embodiment but the scope thereof is determined by the claims.

I claim:

1. A full-opening check valve adapted for coupling into a pipeline of a specified upstream and downstream sizes which are equal to define a valve which will pass a pipeline pig of sizes up to a pig making full circle contact with the upstream and downstream pipes which check valve comprises a funnel shaped housing having one end sized to be welded to a downstream pipe and which one end includes an axial opening equal to the pipe in internal diameter and which housing enlarges to a diameter larger than the pipe internal diameter, and which housing ends at a transverse shoulder;

an end plate welded across said housing at said transverse shoulder, said end plate having an axial passage matching the upstream pipeline internal diameter, said end plate further being counter bored to define a downstream shoulder;

a flapper valve sized to fit against said shoulder and having a circular shape;

a hinge pin joined to said flapper valve;

a hinge pin passage means in said end plate perpendicular to the path of flow through said housing, said passage means being spaced from said shoulder to pivotly rest said flapper valve against said shoulder in a fully closed position closing said axial passage to reverse flow;

a curved guide plate in said housing downstream from said end plate positioned to bottom support a pig passing through said housing and which plate slopes toward the end opening in said housing and which plate further extends across said housing;

an appendage to said end plate having a bore aligned with the hinge pin passage and disposed for receiving the hinge pin therein; said bore having an internally threaded counterbore for receiving the externally threaded end of a sleeve, a seal means for preventing leakage around said hinge pin; and the other end of said sleeve being threadedly connected to a cap nut for protecting the end of said hinge pin.

2. The apparatus of claim 1 wherein said flapper valve is joined to said hinge pin by a tab joined to said flapper valve on its downstream face wherein said flapper valve is formed of a circular disc with parallel faces, and said end plate is notched to receive said tab into said notch when said flapper valve moves to the full open position.

3. The apparatus of claim 2 including an upright support beneath said guide plate which is joined to said housing and is parallel to said end plate.

* * * * *